United States Patent [19]

Beuch et al.

[11] 4,193,102
[45] Mar. 11, 1980

[54] DISK FILE MACHINE WITH CABLE CONNECTION TO TRANSDUCERS

[75] Inventors: Wallace E. Beuch, Pine Island; George J. O'Konski; Kenneth D. Rusch, both of Rochester; Thomas A. Wytaski, Pine Island, all of Minn.

[73] Assignee: International Business Machines Corporation, Armonk, N.Y.

[21] Appl. No.: 950,886

[22] Filed: Oct. 12, 1978

[51] Int. Cl.² .................... G11B 5/54; G11B 5/016; G11B 21/22
[52] U.S. Cl. .................... 360/105; 360/99; 360/130.34
[58] Field of Search .................. 360/105, 97, 99, 106, 360/130.34; 346/137; 274/9 B, 39 A

[56] References Cited

U.S. PATENT DOCUMENTS

| 3,678,481 | 7/1972 | Dalziel et al. | 360/130.34 |
| 3,946,439 | 3/1976 | Castrodale et al. | 360/105 |
| 4,085,428 | 7/1978 | Green et al. | 360/130.34 |

OTHER PUBLICATIONS

Bailey et al., IBM Tech. Disc. Bull., vol. 18, No. 7, Dec. 1975, p. 2246.

Primary Examiner—Robert S. Tupper
Attorney, Agent, or Firm—Keith T. Bleuer

[57] ABSTRACT

A disk file machine having a transducer or a pressure pad opposite a transducer movable to engage a magnetic disk rotatably disposed in a magnetic diskette assembly in the machine and having a pressure plate opposite a platen portion for holding the disk in a proper data transferring plane, and a manually operable knob mechanically connected with the movable transducer or pressure pad and with the pressure plate for moving these parts from original positions, which are widely separated from the opposite parts to allow positioning of a magnetic diskette in the machine, to intermediate positions in which the spacing is less. The machine includes a solenoid mechanically connected with the movable transducer or pressure pad and mechanically connected with the pressure plate for moving these parts from their intermediate positions to final positions in which the movable transducer or pressure pad engages the disk and in which the pressure plate grips the diskette and holds it in a proper data transferring plane. The mechanical connections from the knob to the pressure plate and to the movable transducer or pressure pad include an oscillatable shaft connected with the knob and having an offset or eccentric portion effective for moving these parts from original to intermediate positions. The solenoid is positioned on a second side of the machine opposite a first side carrying the oscillatable shaft, and a flexible cable connects the solenoid with mechanism on the first side of the machine for moving the pressure plate and for moving the movable transducer or pressure pad from intermediate to final positions.

16 Claims, 8 Drawing Figures

DISK FILE MACHINE WITH CABLE CONNECTION TO TRANSDUCERS

CROSS REFERENCES TO RELATED APPLICATIONS

This application related to the co-pending application of J. A. Carlson et al., Ser. No. 950,756, filed Oct. 12, 1978 for Collet Loading Apparatus.

BACKGROUND OF THE INVENTION

The invention relates to magnetic disk file machines and particularly to such machines adapted to receive magnetic disk assemblies or diskettes of the type disclosed in U.S. Pat. No. 3,668,658.

Prior machines using such diskettes have generally included a swingable door for moving a collet into pressure relationship with respect to a driving hub for gripping the disk of such a diskette and drivingly rotating the disk and have included a solenoid for moving a pair of transducers into engagement with the disk and for moving a pressure plate toward an opposite platen portion for holding the disk in the proper plane for data transfer. Such a machine is disclosed in U.S. Pat. No. 4,089,029. A prior variation of such a machine included a pressure pad movable toward an opposite transducer to hold the disk in data transferring engagement with the transducer, and the pressure pad was operable by a solenoid similar to that just mentioned but carried by the swingable door so that the pad was moved toward but yet remained out of engagement with the disk as the door was closed.

SUMMARY OF THE INVENTION

It is an object of the present invention to provide an improved machine for using such diskettes which is considerably thinner than the machines above described and does not include a space-requiring swingable cover.

More particularly, it is an object of the present invention to provide a manually operable knob and mechanical connections thereto on one side of a disk drive machine for moving a pair of transducers into intermediate positions and for moving a pressure plate into an intermediate position with respect to an opposite platen portion cooperable with the pressure plate for holding the diskette in a proper plane. Alternately, it is an object to provide a variation in which a pressure pad is so moved and with respect to an opposite transducer.

It is a further object of the invention to provide an improved disk drive machine which has, on the side of the machine opposite that on which a transducer carriage is disposed, a solenoid for completing the movements of the pressure pad or transducers and for completing the movement of the pressure plate with respect to the platen portion, moving these parts from their intermediate positions to final positions in which the transducers or pad engages the disk and in which the pressure plate grips the diskette between it and the opposite platen portion.

DESCRIPTION OF THE PREFERRED EMBODIMENT

Figure 4:
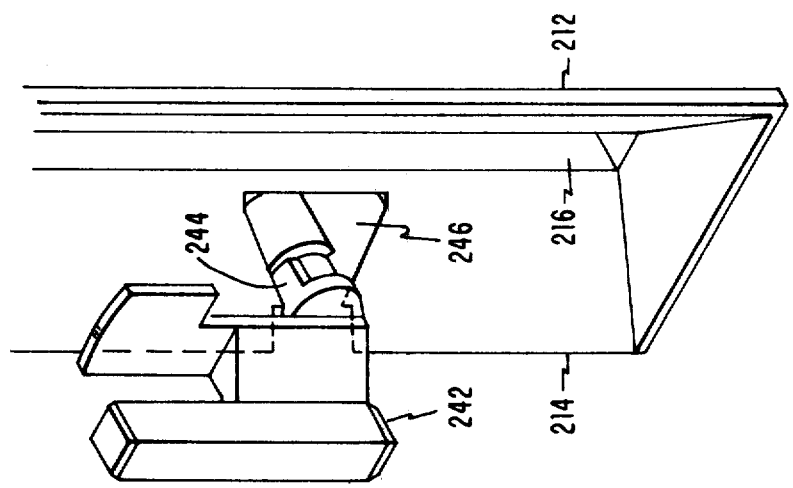
FIG. 4 is a fragmentary isometric end view of the machine showing the end on the right of FIG. 2 and on the left of FIG. 3.
Figure 1:
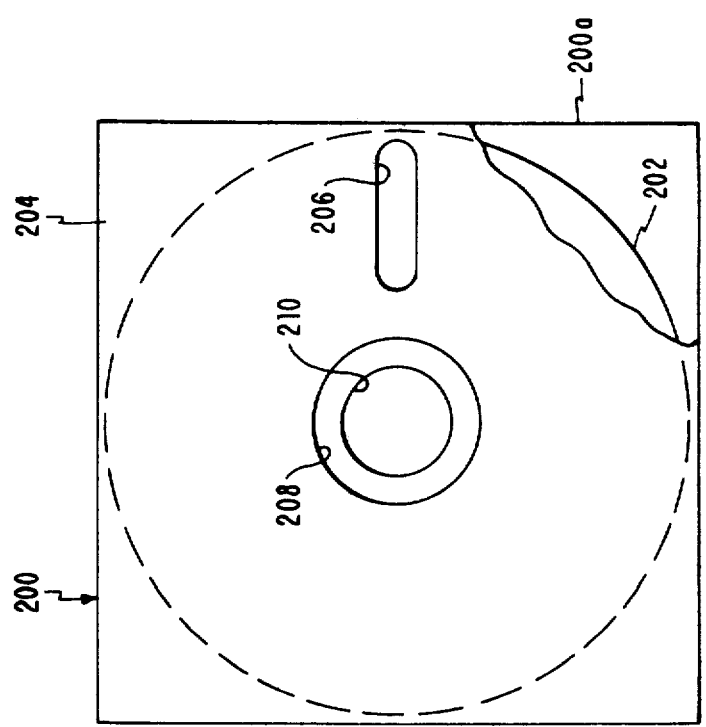
FIG. 1 is a plan view of a magnetic disk assembly which may be used in the disk drive machine illustrated and described herein.

The disk file machine about to be described herein utilizes a magnetic diskette 200 (see FIG. 1) comprising a thin flexible magnetic disk 202 rotatably disposed in a square disk containing jacket 204. The jacket 204 has aligned radially extending slots 206 and central openings 208 in its two thicknesses. The disk 202 has a central hold 210 through it which is of somewhat small diameter than the openings 208. The diskette 200 is of the general type disclosed in U.S. Pat. No. 3,668,658, and this patent may be referred to for further details of the diskette 200.

The disk file machine (see FIGS. 2 and 3 in particular) comprises castings 212 and 214 which are fixed together, as by means of screws, so as to form a machine base A. The casting 214 is provided with a slot 216 on its end into which a diskette 200 may be inserted, and the casting 212 is provided with a pair of stops 218 for limiting the movement of the diskette 200 into the machine.

A machine hub 220 having a central cavity 220a is rotatably disposed in the casting 212 by means of a central shaft 222. A drive roll 224 is fixed on the end of the shaft 222 opposite that for the hub 220, and the roll 224 and hence the shaft 222 and hub 220 are driven from an electric motor 226 mounted on the casting 212. The drive is by means of a belt 228 passing around the roll 224 and around a small diameter roll 230 fixed on the output shaft of the motor 226.

Figure 2:
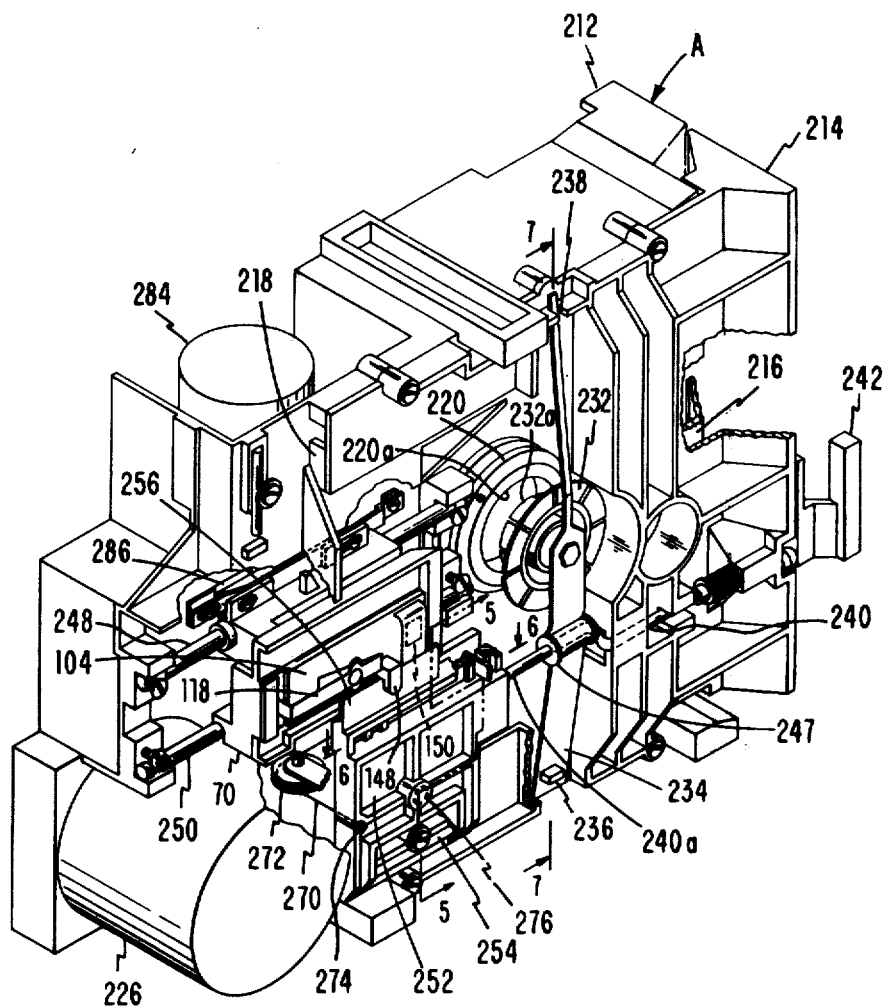
FIG. 2 is a fragmentary isometric view of a disk drive machine incorporating the principles of the invention and including a carriage carrying a pair of transducers adapted to be effective on the opposite sides of the magnetic disk assembly, the view showing in particular one side of the machine.
Figure 3:
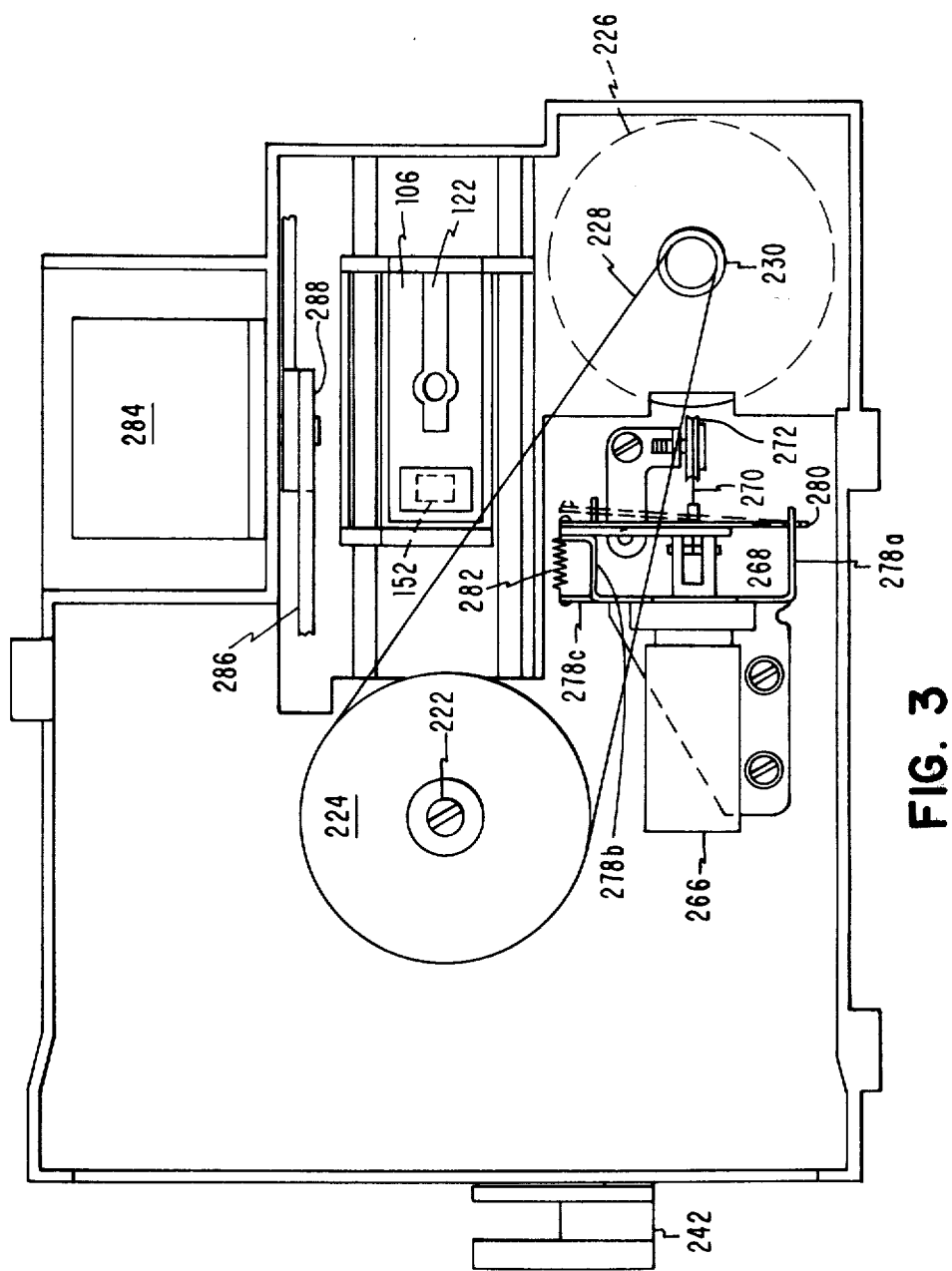
FIG. 3 is a side elevational view of the machine showing the opposite side of the macine.
Figure 7:
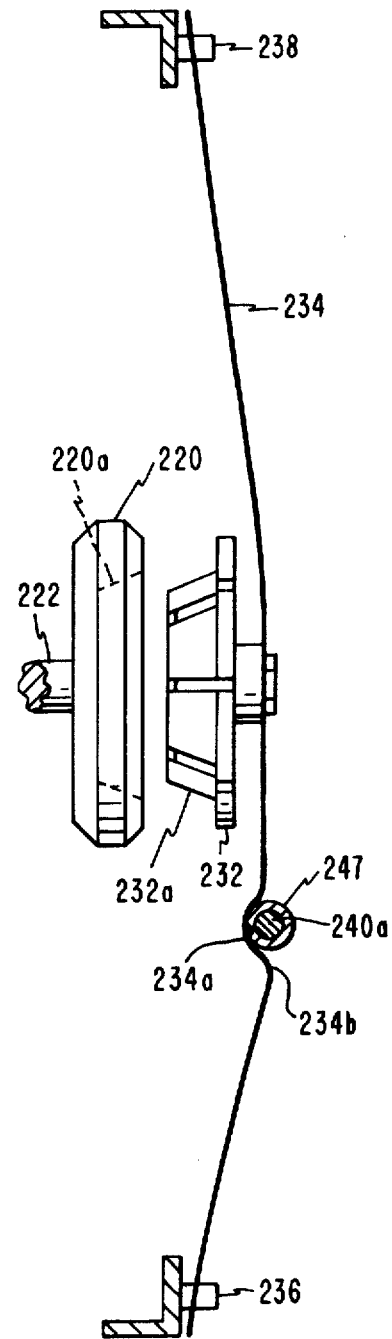
FIG. 7 is a sectional view of an enlarged scale taken on line 7—7 of FIG. 2.

A collet 232 is rotatably carried on a leaf spring 234 so that the collet 232 is substantially coaxially disposed with respect to the hub 220. The collet 232 has a tapered end portion 232a, and the collet is adapted to be moved toward the hub 220 so as to engage the disk 202 between the collet and hub, with the tapered end portion 232a entering the cavity 220a. The spring 234 is pivotally mounted at its lower end with respect to the casting 214 by means of a boss 236 formed on the casting 214 and extending through a hole in the spring 234 adjacent its lower end. The upper end of the spring 234 is slideably disposed in a slot 238 formed in the casting 214. The spring 234 bears at both ends on the casting 214 and due to its inherent resiliency bows outwardly away from the hub 220 as shown in FIGS. 2 and 7 so as to separate the collet 232 from the hub 220.

Force is exerted on the spring 234 so as to straighten it and to move the collet 232 toward engagement with the hub 220 by a shaft 240 which extends through portions of the casting 214 and is thereby rotatably disposed in the casting 214. A knob 242 is fixed with respect to the shaft 240 and is disposed at one end of the casting 214 so that, in one position of the knob 242, it overlies the slot 216 and thus prevents a movement of the diskette 200 into or out of the slot 216. The knob 242 is provided with an abutment 244 striking ends of a depression 246 in the casting 214 so as to limit the rotation of the knob 242 and shaft 240 to 90°. The shaft 240 is provided with an offset or eccentrically disposed portion 240a which has a roller 247 disposed on it. The roller 247 bears against the spring 234 and rests in a depression 234a at one end of a boss 234b in the spring in the positions of the parts shown in FIGS. 2 and 7.

A pair of round support rods 248 and 250 are fixed in the casting 214, and a transducer carriage 70 is slideably disposed on the rods 248 and 250. The carriage 70 may be substantially the same as the carriage 70 disclosed in Castrodale et al. U.S. Pat. No. 4,089,029, issued May 9, 1978; and the same reference numerals are used for the carriage shown herein and its parts as in said patent. The carriage 70 as shown in FIG. 2 thus includes a swing arm 104 acted on by a leaf return spring 118. The swing arm 104 carries a transducer 150 and has a hook 148 fixed thereon. The transducer 150 is adapted to bear on one side of the disk 202 when the diskette 200 is positioned in the machine. The carriage 70 also has a transducer 152 (see FIG. 3) opposite the transducer 150 which is adapted to bear on the other side of the disk 202 and which is carried by a swing arm 106 acted on by a leaf return spring 122. The swing arms 104 and 106 and the transducers 150 and 152 are constrained to move apart and together simultaneously as taught by said U.S. Pat. No. 4,089,029.

Figure 5:
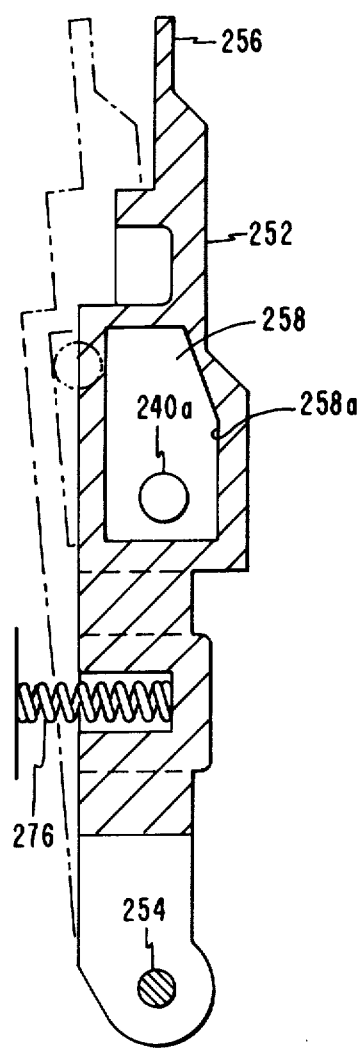
FIG. 5 is a sectional view on an enlarged scale taken on line 5—5 of FIG. 2.
Figure 6:
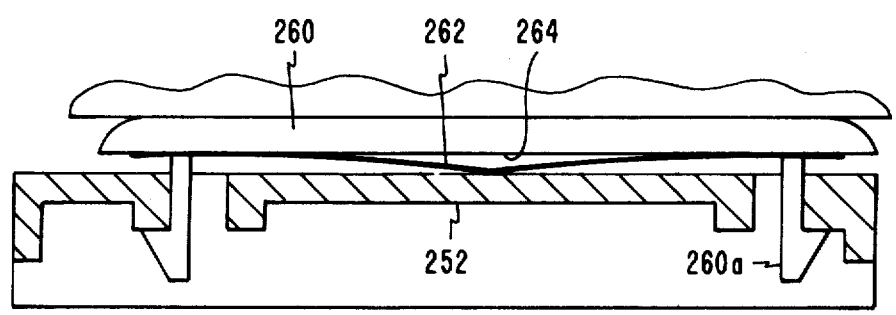
FIG. 6 is a fragmentary sectional view on an enlarged scale taken on line 6—6 of FIG. 2.

A bail 252 is swingably disposed on the casting 214 by means of a pivot rod 254. The bail 252 has a relatively thin top flange 256 underlying the hook 148 and has an end cavity 258 into which the offset shaft portion 240a extends. The width of the cavity 258 is considerably greater than the diameter of the shaft portion 240a as is shown in FIG. 5. A pressure plate 260 (see FIG. 6) is carried by the bail 252 by means of lug portions 260a which extend through and overlie the back surface of the bail 252 illustrated in FIG. 2. A leaf spring 262 is disposed between the plate 260 and the bail 252 for yieldably holding the plate 260 at the limit of its motion away from the bail 252 as limited by the lug portions 260a. The casting 212 is provided with a platen portion 264 opposite the pressure plate 260 with which the plate 260 may cooperate.

An electric solenoid 266 (see FIG. 3) for swinging the bail 252 is disposed on the side of the casting 212 opposite that on which the platen portion 264 is provided. The solenoid 266 includes an armature 268, and the armature 268 is connected by means of a flexible cable 270 with the bail 252. The cable 270 extends around a rotatable idler pulley 272, which is fixed on its axis with the casting 212, and through an opening in the casting 212 to the bail 252. The cable 270 extends through a side slot in the bail 252, and an eyelet 274 is fixed on the end of the cable 270 so that the cable 270 may be effective to swing the bail 252 and the pressure member 260 carried thereby toward the platen portion 264 of the casting 212. A return spring 276 (see FIG. 5) is provided between the casting 212 and the bail 252 for holding the eyelet 274 in engagement with the bail 252, with the cable 270 being thereby held taut.

The solenoid 266 is fixed to the casting 212 by means of a U-shaped bracket 278 which has legs 278a and 278b above and below the armature 268. A stop plate 280 extends through the lower leg 278a and has a swinging connection therewith. The stop plate 280 abuts the end of the leg 278b, and a spring 282 is provided between the plate 280 and an upwardly extending lug portion 278c of the bracket 278. As will be observed from FIG. 3, the stop plate 280 when in contact with the end of the bracket leg 278b is in close proximity to the end of the armature 268; and the cable 270 extends through a relatively small hole provided in the stop plate 280.

The transducer carriage 70 is moved along the rails 248 and 250 by means of a motor 284 so as to register the transducers 150 and 152 with different concentric tracks on the disk 202, and the motor 284 is preferably of the electrical stepping type. The motor 284 is connected to the carriage 70 by means of a flexible band 286 which is fixed at its ends to the carriage 70 and extends around a roll 288 fixed on the output shaft of the motor 284.

In operation, the diskette 200 is inserted into the slot 216 with its edge 200a leading. At this time, the knob 242 is out of alignment with the slot 216, permitting the free entry of the diskette 200 into the slot. The roller 247 lies in the depression 234a of the spring 234, and the collet 232 is at its maximum distance from the hub 220 permitting the free passage of the diskette 200 between the collet 232 and the hub 220. The offset shaft portion 240a is in contact with the inner surface 258a of the cavity 258, and the shaft portion 240a thus holds the bail 252 swung outwardly from the casting 214 at a maximum distance. With the bail 252 at this position, the bail flange 256 acts on the hook 148 of the carriage assembly 70 and holds the transducers 150 and 152 out of engagement with each other so that the diskette 200 may pass between the transducers. The bail 252 also holds the pressure plate 260 out of engagement with the platen portion 264 so that the diskette 200 may pass between the pressure plate 260 and the platen portion 264. The diskette 200 is moved to the limit of its movement into the machine into contact with the stops 218, and the center of the disk hole 210 at this time is coaxial with the axes of the collet 232 and the hub 220. With the bail 252 being at its limit of its movement under the action of the offset shaft portion 240a, the cable 270 is under tension; and the cable 270 holds the stop plate 280 in its dotted-line position shown in FIG. 3 against the action of the spring 282 and out of contact with the end of the bracket leg 278b. The bail 252 under these conditions may be said to be in its original position at the limit of its swinging movement away from the platen portion 264 and casting 214, and the transducers 150 and 152 and the pressure plate 260 may be said to have corresponding original positions.

With the diskette 200 being completely inserted into the machine, into contact with the stops 218, the knob 242 and the shaft 240 are swung through 90°; and this has the effect of swinging the roller 247 downwardly, out of the depression 234a and across the boss 234b in the spring 234. This substantially straightens the spring 234 and moves the collet 232 into a pressure relationship with respect to the hub 220 to cause the disk 202 to be gripped between the hub 220 and the collet 232. The hub 220 is driven from the motor 226 through the belt 228 and rolls 224 and 230, and the disk 202 thus rotates within the jacket 204 which remains stationary.

This movement of the knob 242 and shaft 240 through 90° also moves the offset shaft portion 240a out of engagement with the surface 258a of the cavity 258, allowing the spring 282 to swing the stop plate 280 against the end of the bracket leg 278b. The stop plate 280 in moving into contact with the bracket leg 278b acts on the armature 268, and the armature 268 through the cable 270 and eyelet 274 pulls the bail 252 into an intermediate position against the action of the spring 276, this intermediate position of the bail 252 being closer to the platen portion 264 and the casting 214 than the original position of the bail. The pressure plate 260 is closer to the diskette 200 and to the platen portion 264 than previously; and the flange 256 still supports the hook 148 and the swing arm 104 of the carriage 70 so that the transducers 150 and 152 are still out of contact with the disk 202, which is between them, but are closer together than previously. The pressure plate 260 and the transducers 150 and 152 may thus be said to be in intermediate positions corresponding to the intermediate position of the bail 252 under the action of the spring 282.

The bail 252, the transducers 150 and 152 and the pressure plate 260 are moved from their intermediate positions to their final positions under the action of the solenoid 266. When the solenoid 266 is energized for this purpose, the armature 268 is pulled into the solenoid; and the cable 270 passing around the pulley 272 pulls on the bail 252 and moves it toward the casting 214 and platen portion 264. The offset shaft portion 240a is at this time loose within the cavity 258 and does not restrain or otherwise act on the bail 252. The spring 262 between the bail 252 and the pressure plate 260 acts on the latter at this time and causes the pressure plate 260 to grip the diskette 200 between it and the platen portion 264 for holding the disk 202 in its proper plane for a data transfer using the transducers 150 and 152. With this swinging movement of the bail 252, its flange 256 has moved out of contact with the hook 148; and the springs in the carriage assembly 70, including the springs 118 and 122, cause the transducers 150 and 152 to move into engagement with the disk 202. The transducers 150 and 152 extend through the slots 206 in the jacket 204, and data transfer may then take place between the transducers 150 and 152 and the disk 202.

In the event that it is desired to move the transducers 150 and 152 out of contact with the disk 202, as when no data transfer is desired; it is only necessary to deenergize the solenoid 266. The spring 276 will then move the bail 252 back into its intermediate position. The bail 252 in this position has its flange 256 acting on the hook 148, and the transducers 150 and 152 are thereby drawn out of engagement with the disk 202 and are in their intermediate positions. The pressure plate 260 is likewise moved out of position for gripping the diskette 200 between it and the platen portion 264 and is in its intermediate position. When data transfer is again desired, the solenoid 266 is energized, moving the parts back into their final positions.

When it is desired to remove the diskette 200 from the machine, the knob 242 is rotated through 90°. The roller 247 moves into the depression 234a of the spring 234, and the spring 234 is then again in its original bowed disposition in which the collet 232 releases with respect to the machine hub 220 (see FIG. 7). At the same time, the offset shaft portion 240a in acting on the surface 258a of the cavity 258 swings the bail 252 back into its original position. In this original position, as above-described, the flange 256 acts on the hook 148 to separate the transducers 150 and 152, and the pressure plate 260 is back in its original remote position with respect to the platen portion 264 so as to completely release the diskette 200. Since the diskette 200 is free of the collet 232, the transducers 150 and 152 and the pressure member 260, and since the knob 242 is now out of alignment with the slot 216, the diskette 200 may be drawn back out of the machine to be released therefrom.

In view of the fact that the solenoid 266 is only used for moving the transducers 150 and 152 and the pressure plate 260, as well as the bail 252, for the relatively short throws between their intermediate and final positions, rather than for larger throws between their original and final positions, the solenoid 266 may be considerably shorter than would otherwise be required. Since, when the solenoid 266 is de-energized, the transducers 150 and 152 are out of engagement with the disk 202; it is only necessary to de-energize the solenoid 266 in order to move the transducers out of engagement with the disk for reducing transducer and disk wear under the circumstances when no reading or writing action is desired or during the time the carriage 70 is moved radially of the disk for magnetic track changing on the disk. Conceiveably the electronics associated with the solenoid 266 could malfunction in order to de-energize the solenoid when this is not desired, and under these circumstances the spring 276 is effective to move the bail 252 and the transducers 150 and 152 into their intermediate positions in which the transducers are disengaged from the disk 202, and undue disk and transducer wear is obviated under this circumstance also. It is, of course, possible also that the electronics connected with the solenoid 266 could malfunction to maintain the solenoid 266 energized when it is not desired that the transducers 150 and 152 shall remain engaged with the disk 202, and it should be noted that the width of the cavity 258 is sufficiently small so that the offset shaft portion 248 may be effective to move the bail 252, the pressure plate 260 and the transducers 150 and 152 into their original or fully retracted positions when the knob 242 is turned accordingly. Therefore, the diskette 200 may be removed from the machine through the slot 216 even with this malfunction.

Since it is only required that the solenoid 266 move the transducers 150 and 152, the pressure plate 260 and the bail 252 for portions of their complete throws; the solenoid 266 may also be relatively small in diameter. It is desired that the disk file machine be as thin as possible (in the direction of the longitudinal center lines of the hub 220 and collet 232), and the small diameter of the solenoid 266 and the placement of the solenoid with its longitudinal axis in a plane at right angles to the axes of the hub 220 and collet 232 and parallel with the plane of the disk 202 provide for rendering the disk file machine quite thin. This result also is attained due to the fact that the solenoid 266 is disposed on the side of the machine opposite that carrying the swingable bail 252 which thus has no more room for components. The use of the collet carrying leaf spring 234, which has a minimum dimension (its thickness) along the longitudinal axes of the hub 220 and collet 232 and has its width in the same direction as the slot 216 and castings 212 and 214 and which moves in the direction along the longitudinal axes of the hub 220 and collet 232 for only the distance required to clamp the disk 202 between the collet 232 and hub 220, also allows the attainment of a relatively thin disk drive machine. Also, it will be noted that the electrical stepping motor 284 for moving the transducer carriage 70 has its axis vertical and in a plane at right angles to the longitudinal axes of the hub 220 and collet 232 for this objective.

Figure 8:
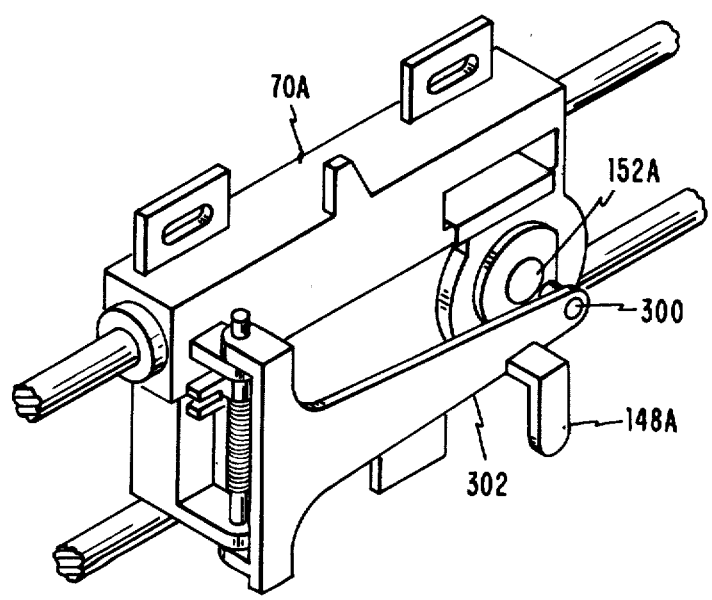
FIG. 8 is an isometric view of a modified type of transducer carriage which has only one transducer and is usable in place of the two transducer carriage in the machine of FIGS. 2-7.

The file machine embodiment of which FIG. 8 shows a part is the same as that illustrated in FIGS. 2–7 with the exception that the transducer carriage 70A is substituted for the carriage 70 and is of the type having only a single transducer 152A. A pressure pad 300 is carried by a swing arm 302 which is swingably mounted on the carriage 70A and is acted on by suitable spring means so as to urge the pad 300 toward the transducer 152A to hold the disk 202 on the transducer. The arm 302 has a hook portion 148A, and this is acted on by the flange 256 of the bail 252 in the same manner as the flange 256 acts on the hook 148. The pad 300 is therefore drawn out of engagment with the transducer 152A so as to allow the insertion of a diskette 200 in place between the pad 300 and the transducer 152A whenever the bail 252 is swung outwardly away from the casting 214 and the platen portion 264. A similar pressure pad-transducer carriage is shown in Dalziel et al. U.S. Pat. No. 3,678,481 which may be referred to for details of such a carriage assembly.

Having thus described our invention, what we claim as new, and desire to secure by Letters Patent is:

1. A magnetic disk drive machine including:
   means for gripping and rotatably driving a magnetic disk,
   a carriage embracing the disk with a pair of opposite parts of the carriage on opposite sides of the disk, one of said parts constituting a magnetic transducer,
   a yielding connection of one of said parts to the remainder of said carriage making the latter part a movable part and allowing it to be moved away from the other one of said parts to allow the disk to freely move with respect to said parts,
   means for moving said movable part between an original position in which it is substantially spaced from said other part and an intermediate position in which it is closer to but still spaced from said other part and including an oscillatable shaft carrying an eccentric portion which is so effective when the shaft is oscillated, and
   means for moving said movable part between its said intermediate position and a final position in which said movable part is in contact with said other part except for the thickness of said disk therebetween and including an electric solenoid mechanically connected with said movable part.

2. A magnetic disk drive machine as set forth in claim 1, said pair of opposite parts of the carriage on opposite sides of the disk both constituting magnetic transducers and being mechanically connected together to be constrained to move together and apart simultaneously.

3. A magnetic disk drive machine as set forth in claim 1 and including a machine base and a swingable member swingingly mounted on said base and effective on said movable part as said swingable member is swung, said eccentric portion being effective on said swingable member so as to move said swingable member between original and intermediate positions corresponding to said original and intermediate positions of said movable part and said solenoid being mechanically connected to said swingable member for moving said swingable member between intermediate and final positions corresponding to said intermediate and final positions of said movable part.

4. A magnetic disk drive machine as set forth in claim 3 and including a flexible cable connecting said solenoid with said swingable member for moving said swingable member between its said intermediate and final positions.

5. A magnetic disk drive machine as set forth in claim 4, said swingable member having a cavity therein for receiving said eccentric portion and the machine including a spring effective on said cable for moving said swingable member from its original position to its intermediate position when said oscillatable shaft and said eccentric portion are rotated out of original positions, and a stop for limiting the effectiveness of said spring in moving said swingable part beyond said intermediate position toward said final position of said swingable part, said cavity being of greater transverse dimension than said eccentric portion whereby said solenoid thereafter is effective to move said swingable member from its intermediate position to its final position.

6. A magnetic disk drive machine as set forth in claim 1 and including a machine base and a swingable member swingingly mounted on said base and effective on said movable part as said swingable member is swung, said eccentric portion being effective on said swingable member so as to move said swingable member between original and intermediate positions corresponding to said original and intermediate positions of said movable part and said solenoid being mechanically connected to said swingable member for moving said swingable member between intermediate and final positions corresponding to said intermediate and final positions of said movable part, said swingable part including a cavity for receiving said eccentric portion so that the eccentric portion is effective for moving said swingable part between its said original and intermediate positions.

7. A magnetic disk drive machine as set forth in claim 6, said cavity being of greater transverse dimension than said eccentric portion so that said solenoid may be effective for moving said swingable member between its intermediate and final positions without corresponding movement of said shaft or eccentric portion.

8. A magnetic disk drive machine including:
   means for gripping and rotatably driving a magnetic disk,
   a carriage embracing the disk with a pair of opposite parts of the carriage on opposite sides of the disk, one of said parts constituting a magnetic transducer,
   a yielding connection of one of said parts to the remainder of said carriage making the latter part a movable part and allowing it to be moved away from the other one of said parts to allow the disks to freely move with respect to said parts,
   an electric solenoid having its axis extending substantially parallel with the plane of said disk, and
   mechanical connecting means connecting said movable part and said solenoid so that the solenoid may cause movement of said movable part with respect to the remainder of said carriage,
   said mechanical connecting means including a flexible cable and a idler pulley around which the cable extends toward said movable part.

9. A magnetic disk drive machine as set forth in claim 8, said mechanical connecting means including also a swingable member acted upon by a spring and which when swung against the action of the spring moves said movable part toward said other part, said flexible cable connecting said solenoid with said swingable member and said idler pulley changing the direction of said cable so that said solenoid when energized moves said swingable member against said spring.

10. A magnetic disk drive machine including:
- a machine base,
- a drivingly rotated machine hub carried by said base and a collet movably mounted with respect to said base so as to move toward said hub for thereby gripping a magnetic disk between the collet and hub for driving by the hub,
- a carriage reciprocatively mounted with respect to said base and embracing the disk with a pair of opposite parts of the carriage on opposite sides of the disk, one of said parts constituting a magnetic transducer,
- a yielding connection of one of said parts to the remainder of said carriage making the latter part a movable part and allowing it to be moved away from the other one of said parts to allow the disk to freely move with respect to said parts,
- a member swingably mounted on said base on one side thereof effective on said movable part to cause it to move with respect to said other part of the carriage,
- an electric solenoid mounted with respect to said base on the other side of said base, and
- mechanical connecting means connecting said swingable member and said solenoid so that the solenoid may cause movement of said swingable member and thereby of said movable part of said carriage with respect to said other part of said carriage,
- said mechanical connecting means including a flexible cable connecting said solenoid with said swingable part.

11. A magnetic disk drive machine including:
- means for gripping and rotatably driving a magnetic disk,
- a carriage carrying a magnetic transducer in data transferring proximity with the magnetic disk,
- means constraining said carriage to move in a path parallel with the plane of said disk to maintain said transducer in data transferring relationship with the disk,
- disk supporting means positioned opposite said transducer,
- means movably mounting said disk supporting means so that it moves toward and away from said transducer and in a direction normal to the path of movement of said carriage,
- an electric solenoid having its longitudinal axis extending substantially parallel with the path of movement of said carriage, and
- direction changing force transmitting means connecting said solenoid with said disk supporting means and changing the direction of the force from a direction parallel with the axis of the solenoid to a direction normal thereto so that said solenoid is effective to move said disk supporting means in a direction normal to the path of movement of said carriage and toward said transducer whereby the disk supporting means supports the disk with respect to the transducer.

12. A magnetic disk drive machine as set forth in claim 11, said disk supporting means being carried by said carriage and having a swinging connection with the carriage.

13. A magnetic disk drive machine as set forth in claim 12, said disk supporting means constituting a second magnetic transducer and the disk drive machine including:
- means providing a swinging connection of said first named transducer with said carriage, and
- mechanical connecting means between said transducers so that the transducers together move toward and apart from each other.

14. A magnetic disk drive machine as set forth in claim 11 and including a machine base for mounting said means for gripping and rotatably driving a magnetic disk, said carriage being reciprocatively mounted with respect to said base on one side of the base so as to travel in said path and said disk supporting means also being positioned on this side of said base, said solenoid being mounted with respect to said base on the other side of said base, said force transmitting means being mounted with respect to said base so as to transmit a force from said solenoid on one side of said base to said disk supporting means on the other side of said base.

15. A magnetic disk drive machine including:
- means for gripping and rotatably driving a magnetic disk,
- a carriage carrying a magnetic transducer and constrained to move so as to position the magnetic transducer on different concentric magnetic tracks on said disk,
- a disk supporting member and means for movably mounting said disk supporting memeber so that it is positioned opposite said transducer and moves toward and away from the transducer,
- first moving means for moving said disk supporting member between an original position in which it is substantially spaced from said transducer and an intermediate position in which it is closer but still spaced from said transducer, and
- second moving means for moving said disk supporting member between its said intermediate position and a final position in which said disk supporting member is in contact with said transducer except for the thickness of the disk therebetween so as to support the disk with respect to the transducer and including an electric solenoid mechanically connected with said disk supporting member.

16. A magnetic disk drive machine as set forth in claim 15, said disk supporting member constituting a second magnetic transducer and the disk drive machine including:
- means movably mounting said transducers with respect to the carriage, and
- mechanical connecting means between said transducers so that the transducers together move toward and apart from each other.

* * * * *